United States Patent [19]

Weeks

[11] Patent Number: 5,409,573
[45] Date of Patent: Apr. 25, 1995

[54] COMPOSITES FROM WET FORMED BLENDS OF GLASS AND THERMOPLASTIC FIBERS

[75] Inventor: Gregory P. Weeks, Hockessin, Del.

[73] Assignee: E. I. Du Pont de Nemours and Company, Wilmington, Del.

[21] Appl. No.: 174,524

[22] Filed: Dec. 28, 1993

Related U.S. Application Data

[63] Continuation-in-part of Ser. No. 935,348, Aug. 28, 1992, abandoned, which is a continuation of Ser. No. 688,421, Apr. 22, 1991, abandoned, which is a continuation-in-part of Ser. No. 192,364, May 10, 1988, abandoned.

[51] Int. Cl.$^6$ .......................................... D21H 13/40
[52] U.S. Cl. .................................. 162/145; 162/123; 162/146; 162/149; 162/156; 162/183; 162/206
[58] Field of Search .............. 162/145, 156, 169, 152, 162/146, 183, 123, 206, 149, 207

[56] References Cited

U.S. PATENT DOCUMENTS

| | | | |
|---|---|---|---|
| 3,063,883 | 11/1962 | Brissette | 162/146 |
| 4,645,565 | 2/1987 | Vallee et al. | 162/146 |
| 4,929,308 | 5/1990 | Gerault et al. | 162/145 |

FOREIGN PATENT DOCUMENTS

| | | |
|---|---|---|
| 62142 | 10/1982 | European Pat. Off. . |
| 62-21897 | 1/1987 | Japan .................. 162/156 |

*Primary Examiner*—Peter Chin

[57] ABSTRACT

A process for forming a self-supporting preform layer of a homogeneous blend of relatively long glass staple length fibers and wettable fine denier staple length thermoplastic filaments wherein a neutral pH aqueous slurry of the glass fibers and filaments are formed into a mat using conventional papermaking equipment. In the preferred process the wettable thermoplastic filaments are dispersed first in the water then followed by the addition of the glass fibers. The self-supporting preform when converted into a molded composite structure results in a substantially void-free structure of individual glass fibers embedded in a thermoplastic resin matrix.

7 Claims, 3 Drawing Sheets

COMPOSITES FROM WET FORMED BLENDS OF GLASS AND THERMOPLASTIC FIBERS

BACKGROUND OF THE INVENTION

This application is a continuation-in-part of application Ser. No. 07/935,348 filed Aug. 28, 1992, now abandoned, which in turn is a continuation of application Ser. No. 07/688,421 filed Apr. 22, 1991, now abandoned which in turn is a continuation-in-part of application Ser. No. 07/192,364 filed May 10, 1988, now abandoned.

The present invention concerns a preform for a fully densified composite structure composed of a thermoplastic resin reinforced with individual glass filaments having a length of greater than about 1 cm and making the preform by an aqueous slurry process.

One route to achieving a highly homogeneous distribution of the glass and the thermoplastic resin matrix is to impregnate a glass mat or strand with a molten resin under heat and pressure, another route is to form a mixture of the glass fiber with a powdered form of the matrix resin. In the latter, the glass fiber and the powdered resin are slurried together in water and a nonwoven wet formed sheet is prepared by deposition on a wire screen followed by dewatering and drying. To achieve the desired dispersion of the wet chopped glass fibers, such a process usually includes the need for radical adjustment of the slurry pH or the addition of surface active dispersing aids to the slurry mixture. In other cases polymeric latexes, pulps or flocculants are added to the slurry aimed at overcoming problems encountered in dispersing solid polymeric particles and reinforcing glass fibers in water. However such dispersing aids and procedures can be detrimental to the properties of the formed composite structure and a need for an improved process that produces a product that does not lose product properties. Therefore it is desirable to develop a method for producing a preform layer, which can be readily converted into a glass reinforced structural thermoplastic composite providing a uniformly consolidated shaped article when preform sheets are compression molded, using conventional wet forming or paper makers equipment which combines:

(1) the ability to achieve excellent dispersion of (a) wet chopped glass strand reinforcing materials having a size formulation which promotes good adhesion and properties in thermoplastic composites, in (b) intimate admixture with thermoplastic particles while (2) eliminating the detrimental effects associated with dispersing procedures based on high or low pH, surface active dispersants, and foams, as well as the detrimental effects associated with the use of latexes, synthetic pulps, and polyvinyl alcohol fibers on composite properties.

SUMMARY OF THE INVENTION

The invention relates to preform layers for glass fiber reinforced thermoplastic composites wherein the glass reinforcing fibers have a length of from about 1 cm to about 8 cm, and wherein the intimate mixture of glass reinforcing fiber and thermoplastic matrix resin is first achieved by co-dispersing, in an aqueous neutral pH slurry, wet chop glass strand consisting of bundles of numerous aligned glass fibers adhered with a sizing agent, with thermoplastic resin particles in the form of fine denier, short cut wettable staple fibers. The glass staple fiber to thermoplastic resin fiber weight ratio 1:5 to 1:1. The thermoplastic fibers may be pretreated with a finishing agent to aid their dispersion in water. Finally, the invention provides a means for achieving a composite preform layer with a very uniform, homogenous dispersion of reinforcing fibers and thermoplastic fibers with excellent web strength and processability. Importantly, web strength is achieved without the need of additional process aids such as latexes, synthetic pulps, or polyvinyl alcohol products, which have been used in previous art and which the authors have found detrimental to final composite properties. Further, the disclosed method for creating a composite preform layer eliminates the need for radical adjustment of pH of the aqueous forming slurry, or the addition of dispersing aids to the slurry mixture, or the use of foaming agents to achieve excellent dispersion of the wet chop glass, the residue from which can be detrimental to composite properties. The method produces structural thermoplastic composites exhibiting exceptional properties based on polyester, polyamide, polypropylene, and polyethylene matrix resins. Surprisingly, it has been found that wet chop glass strand consisting of bundles of many fibers adhered by "thermoplastic composite compatible sizings" used in the industry can be substantially dispersed in the desired neutral pH aqueous slurries if the resin particles are in the form of fine fibers which are themselves readily dispersible in the neutral aqueous slurry. The effect is further enhanced if the thermoplastic fibers optionally have preapplied to their surface a wetting agent which further enhances dispersibility of the thermoplastic fibers. Preferably, if a fraction of the thermoplastic fibers have a somewhat lower melting point they can act as binder fibers to give good preform layer integrity during processing, eliminating the need for latexes and pulps used in previous art. The resulting properties are substantially improved over the previous art due to the degree of reinforcing fiber dispersion achieved combined with the elimination of the deleterious elements of the previous art.

The method includes the added steps of stacking a plurality of preform layers in a heated compression mold and subjecting the stacked preform layers to compression molding at a predetermined pressure and temperature to form a uniformly consolidated shaped glass reinforced thermoplastic article having C-scan sound absorption data in the range of from about 24 to about 40 decibels/in. for a 0.125 in. thick sample.

In summary, when the resin fiber is the greater component in the fiber preform, synergistic effects occur in that (1) dispersion of the chop glass fiber bundles is greatly enhanced which has significant advantages for enhancing surface smoothness in molded composite parts, and (2) there is sufficient resin to allow pressure molding of well consolidated plaques which have such excellent C-scans.

DETAILED DESCRIPTION OF THE PREFERRED EMBODIMENT

Figures 1, 1A:
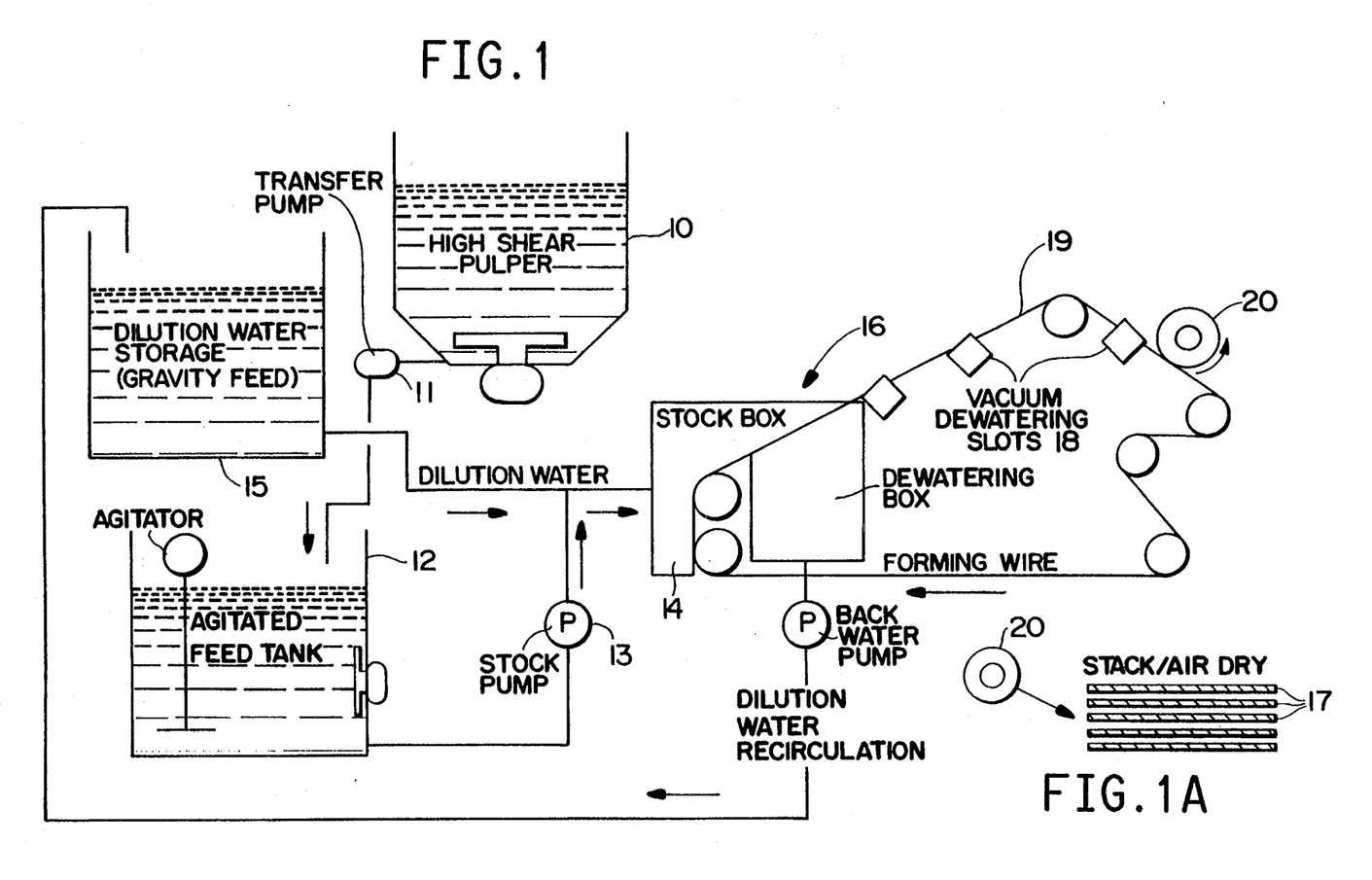
FIGS. 1 and 1A are schematic illustrations of one embodiment of the wet laying process of this invention.

Referring to FIG. 1, the wet laying process of this invention utilizes paper making equipment and generally includes, a pulper 10, an agitated supply tank 12, the head box 14 of an inclined wire paper machine 16, a dewatering section 18, and a windup or driven spool 20. In operation, glass and thermoplastic fibers are dispersed in water in pulper 10. The slurry is pumped via pump 11 from the pulper to an agitated supply tank 12. Feed stock from the supply tank is then pumped by means of pump 13 to the head box 14 where dilution water is added from tank 15 reducing stock consistency by a factor of 5. The slurry is drained through the wire in the usual manner and dewatered by passing over suction slots 18 in the dewatering section. The dewatered sheet 19 is then wound in damp form on driven spool 20. The sheet wound on the spool 20 is unwound in layers 17 and air dried as schematically shown in FIG. 1A.

Figure 2:
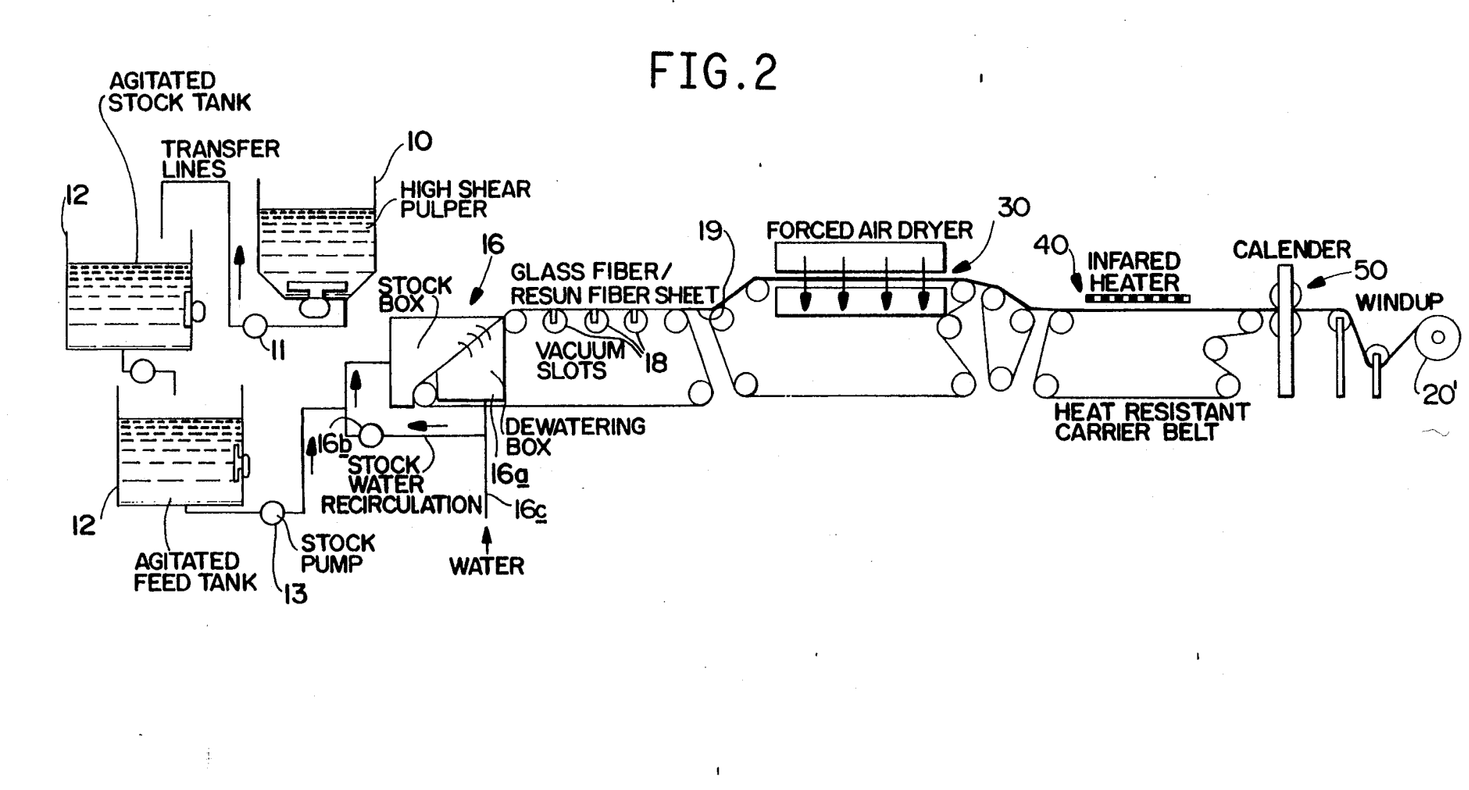
FIG. 2 is a schematic of another embodiment of the wet laying process of this invention.

In an alternate embodiment used in large scale production, the slurry consistency is reduced by a factor of 3-5 with dilution water on being pumped to the feed tanks 12 and further reduced by a factor of 8-10 with additional dilution water from the dewatering box 16a and pipe 16c via pump 16b as substantially shown in FIG. 2, after the sheet 19 is passed over vacuum suction slots 18, it is then dried by passing it through a flat forced air dryer 30 at a temperature of about 500° F. The sheet 19 is then passed under infrared drying element 40 through nip rolls and then wound on spools by windup 20'.

| Papermaking | | Equipment | |
| --- | --- | --- | --- |
| Element Number | Name | Model No. | Manufacturer |
| 10 | Pulper | GP 157 | Bird Machine Co., Inc. South Walpole, MA |
| 13 | Pump | 23B2-B | Gorman-Rupp Mansfield, OH |
| 16 | Papermaking Machine | Labor 23" | Neuf Bruderhaus Reutlingen, W. Germany |

The composite preform layer of this application is formed on conventional papermaking equipment where the forming section of the machine is preferably of the type known as an inclined wire, i.e. the slurry is drained through a forming wire which is inclined at an angle (usually 15 to 45 degrees) into the forming slurry. Such equipment is specifically designed to be capable of forming fibrous mats at moderate to high slurry dilutions and is ideal for processing long (1-8 cm) fibers into nonwoven mats. However, other machine styles can be used as well, such as cylinder formers and others. Sheet drying can be accomplished via a combination of thru-air drying, contact drying, or radiant heat. The maximum temperature reached by the fibrous mat must be sufficient to activate "tacking" of a suitable fraction of the resin fiber to achieve sufficient mat strength for good processability.

The preferred composite preform layer process consists of co-dispersing the glass wet chop fiber in a conventional papermakers pulper, followed by deposition on a wire, dewatering, drying, and heating to a temperature sufficient to active the binder copolymer, optionally light calendaring the sheet, and winding it on a mandrel.

Reinforcing Fiber

The glass reinforcing fiber used in the invention consists of conventional spun glass strand having a diameter between 5 and 50 microns and a cut length of 1 cm to 8 cm. As is common in the industry, such glass strand is produced by forming filaments from a heated bushing and several hundred to several thousand such filament are grouped below bushing where a size is applied to the filaments to meet the requirements of downstream processing. The size consists of a solution or aqueous dispersion of at least a film forming agent, such as a low molecular weight polyester or polyurethane, to protect the glass, and a coupling agent, usually a silane compound such as alpha-aminopropyltriethoxysilane, which is chosen to assist adhesion between the glass/resin interface in the final composite. Typically, this sized strand is chopped to length and shipped "wet" in moisture proof containers to the papermaker. The preferred size material composition is that sold by Owens-Corning Fiberglass (OCF) under the label 133A. Wet chop strand fiber such as this will not disperse in an aqueous slurry at neutral pH. However, co-dispersion of the wet chop strand with wettable thermoplastic fiber in a neutral pH slurry surprisingly achieves good glass fiber bundle dispersion resulting in an advantageous intimate mixture of reinforcing glass fiber and resin fiber.

Resin Fiber

The resin fiber component consists preferably of a fine (0.5-20 denier), short cut (1-5 cm) polyester, polyamide, polypropylene, or polyethylene thermoplastic staple fibers, possibly containing precompounded additives such as an antioxidant and toughner and other ingredients intended to enhance composite properties. Alternatively a portion of the thermoplastic fibers are composed of, or have a sheath coating of, a somewhat lower melting thermoplastic of substantially the same composition, which acts as a heat activated binder during the drying process. Optionally, the thermoplastic fibers (e.g. polyester fibers) may be surface treated with less than 1% of a dispersing aid such as, but not limited to, long chain alkyl phosphates, condensation products of tallow alcohols with polyethylene oxides, and low molecular weight polyesters.

Fiber Dispersion

The dispersion of the fiber is carried out in a conventional paper makers pulper using water at pH 5.5-8.5 at a consistency of 0.25 to 2% by weight solids. Glass to resin weight ratio is between 1/5 to 1/1 and preferably in a range of 1/3 to 1/1. A good dispersion can be carried out by either co-dispersing or preferably first dispersing the resin fiber. The preferred procedure is to disperse the wettable thermoplastic fiber first for 10 minutes in conventional high shear pulper, followed by addition of the wet chop glass strand with an additional 10 minutes of agitation.

Post Processing of the Preform Layer

The preform layer is usually not thick enough as-produced to be used directly to make composite parts. Typically several preform layers will be sheeted and stacked to produce a thickness (usually in the range of 0.5 to 2.0 pounds per square foot) which is suitable for molding. Optionally, it is found useful to mechanically needle the layered stack of preforms to further lock the layers together for easier processing during the molding sequence. Optionally, it is also found useful to add a veiling layer of glass fibers at the top and bottom of the stack, usually only 0.1% to 2% of the full stack basis weight, to attain desirable surface properties during the molding sequence such as reduced tack in contact preheating systems and enhanced surface finish in the final molded part.

Molding of Composite Sheets

Several layers of the resulting sheet can be layered together and placed in a mold and made into a plaque to evaluate physical properties. For condensation polymers such as poly(ethylene terephthalate), the material is dried to <0.02% moisture level prior to molding. It is then placed in a picture frame mold coated with mold release agent. The mold and contents are then placed in the heated platten press at 15 psi and the mold temperature brought to above the resin melt temperature. The pressure is then increased to 500 psi, and the mold and contents are allowed to cool under pressure. The sheet is then removed and ultrasonic scan data, tensile data, and stiffness data are then obtained by the usual methods.

Molding of Composite Components

To obtain useful articles from the preform layer in stacked nonwoven form or consolidation sheet form, one or more compound preform layers are heated by conventional (contact, IR, or forced gas) means to remelt the matrix resin, being careful to dry the sheet first in the case of condensation polymers, and the molten resin and glass reinforcing fiber sheet is placed in a compression mold or stamping press. The material may be squeezed under pressure to shape or flow mold the part, at which time the resin is cooled and the part removed.

Test Methods

Tensile strength

Standard Test Method for Tensile Properties of Plastics (ASTM D638-84).

Flex Modulus

Standard Test Methods for Flexaral Properties of Unreinforced and Reinforced Plastic Materials (ASTM-D790-84a).

Determination Of Degree of Co-Dispersion

Step 1: Select a Representative Sample of the Composite Preform Layer for Analysis Step 2: Sample Preparation Carefully pot the sample in a clear epoxy resin being careful not to disturb the fiber structure. This can be accomplished by placing a roughly 1 cubic inch sample in a small cup, carefully filling the cup with a two part epoxy resin having an initial viscosity of less than 10 poise, and placing the cup in a vacuum chamber to insure good impregnation. Allow the epoxy to cure. Cut a cross section through the potted sample and polish for microscopic inspection.

Step 3: Prepare Photomicrographs

Prepare photomicrographs of the sample cross section showing the distribution of glass and the thermoplastic fiber ends using standard optical microscopy techniques. Such a photomicrograph is represented by FIG. 3 wherein glass fiber ends 100 are shown dispersed with thermoplastic fiber ends 200.

Step 4: Determine Sample Area

Figure 3:
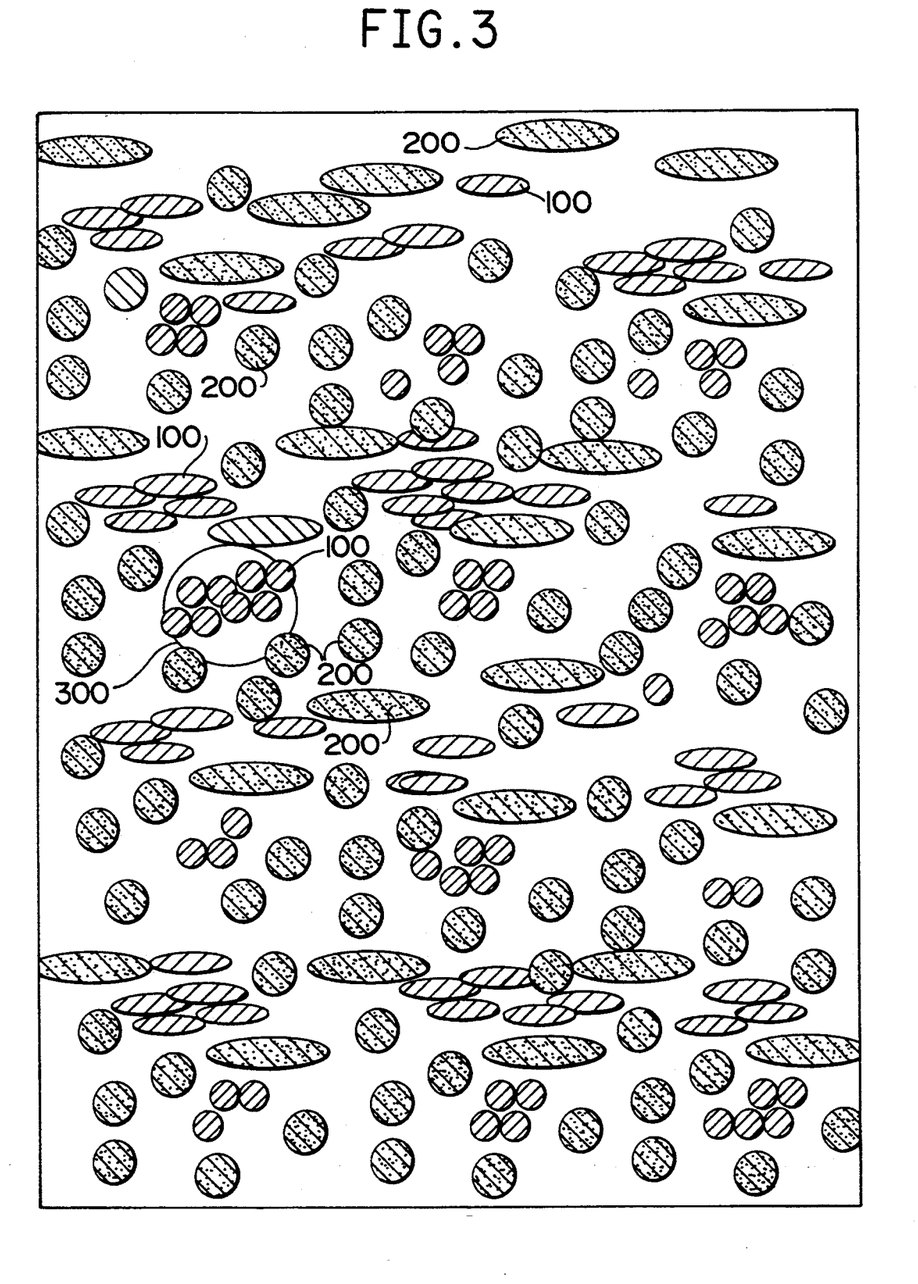
FIG. 3 is a schematic area of a photomicrograph showing the distribution of glass and thermoplastic fiber ends.

Using the photomicrographs, select a sampling area such as FIG. 3 which contains a large number of both thermoplastic and glass fibers such that the ratio of glass to thermoplastic fiber ends is close to the calculated fiber ratio. The "fiber ratio" FR is defined as:

$$FR = (\text{No. TP Fiber Ends/No. Glass Fiber Ends}) = \frac{(\% \text{ Wt. TP}) \cdot (\text{Glass Density}) \cdot (\text{Glass Fiber Length}) \cdot (\text{Glass Fiber Diameter})^2}{(\% \text{ Wt. Glass}) \cdot (\text{TP Density}) \cdot (\text{TP Fiber Length}) \cdot (\text{TP Fiber Diameter})^2}$$

Step 5: Determine the Glass bundle Dispersion Index (GBDI)

Inspect the sample area and determine the largest number of glass fiber ends which can be captured in an imaginary circle 300 without capturing a thermoplastic fiber end. Repeat for at least five separate viewing areas.

Calculate the glass bundle dispersion index as follows:

$$GBDI = \frac{\text{Original No. Fibers/Bundle}}{\text{Average No. Fibers/Bundle in Preform Layer}}$$

Where the original chop strand bundle count can be calculated as below or by direct count:

Original No. Fibers/Bundle=$2.5 \times 10^6$/(Count$\times$Dia.$^2$ (Microns)

wherein count is the number of 100 yds. per lb. in the original strand.

C-Scan—Void Content

As an indication of the final consolidated composite density and uniformity of consolidation, the composite plaque were evaluated using an ultrasonic scanning system.

Ultrasonic scanning equipment is available from:
Testech, Inc.
115 Sunset Drive
P.O. Box 960
Exton, Pa.

Method used was the "C" or area scan method. Frequency used was 5 megahertz. Mode used was transmission through sample plaque of size 7"$\times$7"$\times$0.125" thick emersed in water tank. This method is also known as the pitch-catch method. This DB (loss) is measured and plotted using a color coding system over the full plaque surface to evaluate relative density and uniformity prior to evaluation of tensile and flex properties. DB loss is defined by the following formula:

$$DB\ loss = 20\ Log10\ AG/AR - (GS - GR)$$

AG is the signal amplitude through the sample.
AR is the off-sample reference amplitude.
GS and GR are amplifier gain on and off sample
—1 DB is 10% amplitude reduction
—6 DB is 50% amplitude reduction
—20 DB is 90% amplitude reduction Signal loss in DB due to uniform porosity is proportional to thickness after accounting for reflective losses which are small for this system used (about 1 DB). Therefore C-scan data are reported in DB loss/inch material thickness. DB loss values of 35 DB/inch are considered excellent and represent a well consolidated plaque. This corresponds to a void content of 5–7% as measured by bulk density techniques.

Denier

The weight in grams of 9000 meters of linear material.

EXAMPLE I

In a 150 gallon total capacity Bird Pulper, add 50 gallons of deionized water. 1.5 pounds of 1.5 denier per filament, 0.25 inch staple length, poly(ethylene terephthalate) (PET) fiber having preapplied to the fiber surface 0.5% by weight of a finish consisting of an equal mixture of tallow alcohol ethoxylate (25 moles) and the potassium salt of the mono and diacid phosphate esters of C-12 alcohol were added and dispersed with the high speed agitator for 5 minutes to create a uniform fiber dispersion. 1.0 pound of 1 inch chop glass (OCF TYPE 133A) is then added to the mixture with an additional 68 gallons of deionized water gradually, and the batch is agitated for an additional 10 minutes. The pulper was then pumped to a moderately agitated machine supply tank without further dilution such that the consistency was 0.25% by weight solids. The feed stock was then pumped to the headbox of a 12 inch Bruderhaus inclined wire minipaper machine having a 45 degree incline. The stock was diluted at the headbox to a consistency of 0.05%. The head box stock was drained through the forming wire in the usual manner and dewatered by passing over suction slots. The wire speed was 5 fpm and the resulting sheet was captured on a take up roll in damp form. The sheet then laid out in layers and air dried to ambient moisture level substantially as disclosed in conjunction with FIG. 1. Dry sheet weight was approximately 0.05 pounds per sq. ft. Microscopic cross sectional analysis showed that the wet chop glass fiber bundles were substantially dispersed (reduced from 1,000 to 2,000 filaments per bundle to not more than a few filaments).

The ambient dried nonwoven sheets were stacked to form a 7×7" batt of basis weight 1 pound/sq. ft. and dried in a vacuum oven to 0.02% by weight moisture or less. The dried batt was quickly transferred to a preheated 7×7 inch picture frame mold coated with Miller-Stephenson MS-136 mold release. The mold and contents are then placed between the platten of a hydraulic press with heated plattens. Contact pressure equivalent to 15 psi is then placed on the mold and it is heated to 290° C. as measured by a thermocouple placed in the side of the mold. When full temperature is reached the pressure is gradually raised to 600 psi. When the first evidence of flash is noted at roughly 600 psi, the heaters are turned off, the cooling water to the plattens is turned on, and the mold and contents are allowed to cool to room temperature under 600 psi, approximately 15 minutes. The composite plaque is then removed from the mold. Tensile and Flex bar cut from the plaques shown tensile strengths in excess of 24 ksi and flex modulus of 1.65 MM psi. C-scan data showed plaques to be uniformly consolidated with sound absorption in the range of from about 24 to about 40 DB/inch for a 0.125 inch thick sample.

EXAMPLE II

The procedure is identical to Example I except the mold is heated to 250° C. and where the PET fiber is replaced by 1.8 denier per filament, 0.25 inch staple length nylon fiber having little or no surface finish. The preform mat was observed under the microscope in cross-section and showed similar highly dispersed glass filaments in intimate admixture with nylon fibers. Tensile and Flex bar cut from the plaques showed a tensile strength of 26.7 ksi and flex modulus of 1.6 MM psi. C-scan data showed plaques to be uniformly consolidated with sound absorption in the range of from about 24 to about 40 DB/inch for a 0.125 inch thick sample.

EXAMPLE III

The procedure is identical to Example I except the mold is heated to 200° C. and where the PET fiber is replaced by 6 denier per filament, 0.25 inch staple length polypropylene fiber having the same surface finish as Example I. The preform mat was observed under the microscope in cross section and showed similar highly dispersed glass filaments in intimate admixture with polypropylene fibers. Tensile and Flex bar cut from the plaques shown tensile strengths in excess of 10 ksi and flex modulus of >0.7 MM psi.

EXAMPLE IV

The procedure is identical to Example I where the PET fiber is replaced by the PET fiber containing 0.5% Irganox 1010 antioxidant and 8% of fine particulate elastomer toughner particles. The preform mat was observed under the microscope in cross section and showed similar highly dispersed glass filaments in intimate admixture with polyester fibers. Tensile and Flex bar cut from the plaques shown tensile strengths in excess of 22.5 ksi and flex modulus MM psi. C-scan data showed plaques to be uniformly consolidated with sound absorption in the range of from about 24 to 5 about 40 DB/inch for a 0.125 inch thick sample.

EXAMPLE V

The procedure is identical to Example I where 0.5 inch length OCF 133A glass was used versus 1.0 inch. The preform mat was observed under the microscope in cross section and showed similar highly dispersed glass filaments in intimate admixture with polyester fibers. Tensile and Flex bar cut from the plaques shown tensile strengths in excess of 20 ksi and flex modulus of 1.43 MM psi. C-scan data showed plaques to be uniformly consolidated with sound absorption in the range of from about 24 to about 40 DB/inch for a 0.125 inch thick sample.

EXAMPLE VI

The procedure is identical to Example I where 1 inch long OCF type 685 glass was used in place of OCF type 133A. The preform mat was observed under the microscope in cross section and showed similar highly dispersed glass filaments in intimate admixture with polyester fibers. Tensile and Flex bar cut from the plaques shown tensile strengths in excess of 20 ksi and flex modulus of 1.43 MM psi. C-scan data showed plaques to be uniformly consolidated with sound absorption in the range of from about 24 to about 40 DB/inch for a 0.125 inch thick sample.

EXAMPLE VII

The ingredients were dispersed in the conventional pulper/blended apparatus in the following manner. Approximately 4000 gallons of water were placed in the pulper. Then 315 pounds of 1.5 denier per filament, 0.25 inch staple length, poly(ethylene terephthalate) fiber having preapplied to the fiber surface the same finish as in Example I was added and agitated for 10 minutes. Then 240 pounds (dry weight) OCF 133A-AA glass chop and 45 pounds of sheath core binder fiber (consisting of (30%) sheath of a co-polymer of poly (ethylene terephthalate) having a tack point in the range of 130° C. to 160° C., and a (70%) core of poly (ethylene terephthalate)) were added and agitated for an additional fifteen minutes. The percentage composition for the batch is noted above and the consistency in lbs/lbs water was 1.8% by weight pulper solids.

The resulting uniform and intimately mixed water dispersion of glass and polymeric fiber was flushed to a holding tank with an additional 10,000 gallons of water, resulting in an agitated feed tank consistency of 0.516% by weight solids.

The feed tank slurry was then fed to the forming chamber box of a conventional inclined wire paper machine and the head box forming consistency was adjusted to 0.057%.

The slurry is drained through the forming wire of the machine in the conventional way and formed into a homogeneous nonwoven mat. The mat was first partially dewatered by passing over vacuum suction slots in the conventional manner. Then the mat was dried by passing through a flat, forced air drier with dryer air temperature of 500° F. such that the exit temperature of the mat was measured to be 200° F. The mat was then passed under a set of infrared drying consisting of 6 12-inch wide units with 6 cal-rods each, such that the surface temperature entering the infrared heating zone was 100° F. and exiting was 380° F. Then the mat was passed between a single nip calender with a nip pressure of 100 pli and then wound on 6-inch paper tube cores. The line speed of the machine was 22 feet per minute. The mat weight ranged from 196 to 261 lbs/1300 sq. ft.

Microscopic examination of the mat in cross section showed excellent dispersion of the filaments in intimate admixture with the thermoplastic resin fibers.

The ambient dried nonwoven sheets were stacked to form a 7×7" batt of basis weight 1 pound/sq. ft. and dried in a vacuum oven to 0.02% by weight moisture or less. The dried batt was quickly transferred to a preheated 7×7 inch picture frame mold coated with Miller-Stephenson MS-136 mold release. The mold and contents are then placed between the platten of a hydraulic press with heated plattens. Contact pressure equivalent to 15 psi is then placed on the mold and it is heated to 290° C. as measured by a thermocouple placed in the side of the mold. When full temperature is reached the pressure is gradually raised to 600 psi. When the first evidence of flash is noted at roughly 600 psi, the heaters are turned off, the cooling water to the plattens is turned on and the mold and contents are allowed to cool to room temperature under 600 psi, approximately 15 minutes. The composite plaque is then removed from the mold. Specimens for tensile, flex, and other physical property tests were cut from the plaques and data taken via standard test procedures to analyze the composite properties. Results were as follows:

Tensile strength: 27 ksi
Flex modulus: 1.62 MM psi

C-scan data showed plaques to be uniformly consolidated with sound absorption in the range of from about 24 to about 40 DB/inch for a 0.125 inch thick sample.

EXAMPLE VIII

Approximately 4000 gallons of water were placed in a conventional papermaker high shear pulper. 360 pounds of 5 denier per filament, 0.25 inch staple length, polypropylene fiber were added and agitated for 5 minutes. The polypropylene fiber had 1.9% by weight surface finish consisting of a blend of Nopco 2152-P, Emery 6724 and Kessco PEG-200 dilaurate applied during fiber formation in the conventional manner. The polypropylene used to form the fiber was a homopolymer (number average molecular weight of about 37,000) containing 2800 ppm commercially available antioxidant/UV stabilizers precompounded to provide for polymer stabilization during processing.

240 pounds (dry weight of OCF 133A, 1.0 inch, 13 micron diameter wet chop glasses were then added and agitated for an additional fifteen minutes. The percentage composition for the batch was approximately 40% by weight glass fiber and 60% by weight polypropylene staple fiber. The pulper consistency was 1.8% by weight pulper solids.

The resulting uniform, and intimately mixed, water dispersion of glass and polymeric fiber was flushed with an additional 10,000 gallons of water to a holding tank having two side mount impellers, resulting in an agitated feed tank consistency of 0.516% by weight solids. Optionally up to 200 cc of hydrocarbon defoamer (SA-3 hydrocarbon base, Laurel Co., Philadelphia, Pa. 19134) were added to the agitated holding tank to control minor stock flotation.

The feed tank slurry was then fed to the forming chamber box of a conventional inclined wire paper machine and the head box forming consistency was adjusted to about 0.057%.

The slurry is drained through the forming wire of the inclined wire paper machine in the conventional way and formed into a homogeneous nonwoven mat. The mat was first partially dewatered by passing over vacuum suction slots in the conventional manner. Then the mat was dried by passing through a flat, forced air drier. The dryer air temperature was 450°–500° F. Residence time in the dryer (approximately 20 seconds) was sufficient to fully dry the sheet and, additionally, further heat the polypropylene fiber near temperature in the final stage of the dryer causing melt bonding. The mat was then further passed between infrared heating units while supported on an open mesh bronze carrier wire such that the surface temperature entering the infrared heating zone was 100° F. and exiting was 300° F. The mat was then passed immediately between a single nip calender with a nip pressure of approximately 100 psi and wound on 6 inch paper tube cores. The line speed of the machine was 22 feet per minute. The mat weight ranged from 140 to 160 pounds per square feet.

Microscopic examination of the mat in cross section showed excellent dispersion of the glass filaments in intimate admixture with the thermoplastic resin fibers. A portion (5 to 10%) of the fibers were partially melted, bonding the fibrous mat together. Sheet tensile was in excess of 5 pounds per inch.

Eight 36"×60" such sheets were layered to form a 0.864 pounds per square foot mat. This mat was then fully consolidated to a hard composite sheet with less than 10% void content using a Tyler Industries pneumatic press with aluminum platen capable of heating and cooling. The batt was placed in the press between release cloths and heated to 180° C. under 80 psi pressure, followed by cooling to room temperature. Hard composite sheet made in this way was then cut into blanks suited for use in compression molding conventional bumper back-up beams for the automotive industry. Several such blanks were reheated in IR ovens according to conventional technology used in the compression molding industry and successfully molded into bumper back-up beams weighing approximately 12 pounds each. These beams were tested according to Federal Motor Vehicle Safety Standards (FMVSS Part 581—Bumper Standard and Fixed Barrier Tests) and found to be satisfactory. Test plaque studies were also completed according to the molding method described in Example VII and tested for tensile strength, tensile modulus, and izod impact properties at room temperature with the following results:

Tensile Strength: 13.5 ksi
Elongation: 2.3%
Tensile Modulus: $0.88 \times 10^6$ psi
Notched Izod: 16

EXAMPLE IX

Four samples numbered 1, 2, 3 and 4 were prepared in the following manner:

90 gallons of deionized water was added to a 150 gallon total capacity Bird Pulper. A quantity of (See Table 1. below) of 3.0 denier per filament, 0.25 inch staple length, polyethylene terephthalate fiber is added to the water in the pulper. The polyethylene terephthalate fiber had 0.5% by weight surface finish as described in the application. This fiber/water slurry was then agitated for 5 minutes to create a uniform fiber slurry. A quantity (see Table 1. below) of 1 inch chop fiber glass (OCF Type 133A) was then added to the mixture and the batch was agitated for an additional 10 minutes to form a co-slurry of the glass and resin fiber. The pulper contents were then pumped to a moderately agitated machine supply tank without further dilution such that the consistency was 0.2% by weight solids. The feed stock was then pumped to the head box of a 12 inch wide Bruderhaus inclined wire minipaper machine having a 45 degree incline. The stock was diluted at the headbox to a consistency of 0.04% b the white water loop of the machine in the usual manner. The headbox stock was drained through a moving forming wire in the usual manner and dewatered by passing oven suction slots. The wire speed was 5 fpm and the resulting sheet was captured on a take up roll in damp form. The sheet then laid out in layers and air dried to ambient moisture level. Dry sheet weight was approximately 0.005 pounds per sq. ft.

This process was repeated for each of the test parts shown in Table 1.

The sheets prepared above were then pressed into plaques in the following manner:

The ambient dried nonwoven sheets were stacked to form a 7×7 inch batt of material of basis weight 1 pounds/sq. ft. and placed in a picture frame mold. The mold and contents are then placed between the heated plattens of a hydraulic press. Contact pressure equivalent to 15 psi is then placed on the mold and contents and it is heated to 300° F. and held for 2.5 hours to drive away any residual moisture from the batt of material. The temperature is then increased to 545° F. When full (polyethylene terephthalate melt) temperature is reached the pressure is increased to 800 psi and held at pressure for 5 minutes. The temperature is then reduced at 20° F./minute to 428° F. and held at 428° F. for 1 minute solidifying and polyethylene terephthalate matrix resin. Then the temperature is further reduced to room temperature under 800 psi. The pressure is then releaved and the composite plaque was then removed from the picture frame tool for analysis.

The plaques were then C-scanned to check uniformity and consolidation, and the degree of glass fiber dispersion was observed.

1. Samples 1, 2 and 3 are representative of the product made according to the prior art; Sample 4 is representative of the product of this invention.

2. Table I shows the superior uniformity of consolidation offered by the use of thermoplastic fibers in the wet lay process in accordance to this invention.

TABLE 1

| SAMPLE NO. | PET FIBER (GRAMS) | GLASS FIBER (GRAMS) | RATIO GLASS/RESIN | C-SCAN DB LOSS/INCH | UNIFORMITY OF CONSOLIDATION | GLASS FIBER BUNDLE DISPERSION |
|---|---|---|---|---|---|---|
| 1 | 13.6 | 667 | 49/1 | VERY POOR | VERY POOR | VERY POOR |
| 2 | 114 | 631 | 5.53/1 | >300 | VERY POOR | VERY POOR |
| 3 | 204 | 476 | 2.3/1 | 140 | BETTER, STILL MANY VOIDS | SMALL BUNDLES VISIBLE |
| 4 | 513 | 172 | 1/3 | 20 | EXCELLENT | WELL DISPERSED BUNDLES |

What is claimed:

1. A method for forming a shaped glass reinforced thermoplastic article from a plurality of preform layers composed of individual glass staple filaments intimately mixed with a thermoplastic fiber, comprising: dispersing in an agitated, aqueous neutral pH solution substantially free of other constituents, a plurality of 0.5 to 20 denier, 1 mm to 5 cm staple length thermoplastic fibers and a quantity of wet chopped glass strand to the agitated solution, said glass staple fiber to thermoplastic fiber weight ratio being from 1:5 to 1:1, said chopped glass strand consisting of bundles of numerous aligned glass fibers of length 1 cm to 8 cm and diameter 5 to 50 microns coated and adhered to each other with sufficient integrity to permit handling during normal processing; continuing agitation of the solution to substantially disperse the glass fiber bundles forming a homogeneous filamentary slurry of thermoplastic and glass fibers, feeding the slurry to a screen in a layer, removing water from the layer; drying the layer, further heating the layer to a temperature to thermally bond the thermoplastic component fiber; cooling the layer to form a self-supporting preform layer stacking a plurality of said preform layers in a heated compression mold, and subjecting said stacked preform layers to compression molding at a predetermined pressure and temperature to form a uniformly consolidated shaped glass reinforced thermoplastic article with C-scan sound absorption data in the range of from about 24 to about 40 DB/in. for a 0.125 in. thick sample.

2. The method as defined in claim 1, wherein said thermoplastic fibers are added to the aqueous solution first allowed by the glass fibers.

3. The method as defined in claim 1, wherein said glass fibers are added to the aqueous solution first followed by the thermoplastic fibers.

4. The method as defined in claim 1, wherein said thermoplastic and said glass fibers are added simultaneously.

5. The method as defined in claims 1, 2, 3 or 4 wherein said thermoplastic fibers have a coating of a dispersing aid on their surfaces, and at least a portion of said fibers are coated with a lower melting polymer of substantially the same chemical composition.

6. The method of claim 5 wherein said dispersing aid is a condensation product of tallow alcohols with polyethylene oxides and low molecular weight polyesters.

7. The method of claim 1, said weight ratio being from 1:3 to 1:1.

* * * * *